United States Patent [19]

McMaster et al.

[11] Patent Number: 5,047,077

[45] Date of Patent: Sep. 10, 1991

[54] COMBINATION HEATER QUENCH

[75] Inventors: Harold A. McMaster, Woodville; Robert G. McMaster, Elmore, both of Ohio

[73] Assignee: Glasstech, Inc., Perrysburg, Ohio

[21] Appl. No.: 528,253

[22] Filed: May 24, 1990

[51] Int. Cl.⁵ .............................................. C03B 27/04
[52] U.S. Cl. ........................................ 65/349; 65/114; 65/348
[58] Field of Search .................. 65/114, 348, 349, 104

[56] References Cited

U.S. PATENT DOCUMENTS 2,223,124 11/1940 Owen ...................................... 65/104
4,957,531 9/1990 McMaster et al. ................... 65/104

Primary Examiner—Joye L. Woodard
Attorney, Agent, or Firm—Brooks & Kushman

[57] ABSTRACT

A glass sheet tempering system (10) disclosed comprises a single station heater and quench that includes a heating source (16) for heating the glass sheet (12) and also an air supply (18) for supplying quenching air to temper the heated glass sheet (12). The heating source (16) and air supply (18) are defined by a pair of spaced and opposed plenums (20,20') that provide heating and quenching of the glass sheet (12) generally in one location without having to transport the glass sheet (12) between separate heating and quenching stations.

16 Claims, 5 Drawing Sheets

COMBINATION HEATER QUENCH

TECHNICAL FIELD

This invention relates to apparatus for tempering glass sheets and more particularly to a combined heating and glass sheet tempering system.

BACKGROUND ART

Conventional glass sheet tempering involves heating a glass sheet to about 1150° F. in a glass sheet heating furnace and transferring the glass sheet to a quenching station where quenching air is rapidly applied to the glass sheet to quickly cool and temper the glass sheet. The strength of the tempered glass is increased two to five times that of ordinary sheet glass.

Glass sheet heating furnaces require a substantial capital investment and also require extensive maintenance. Conventional systems which include such a heating station and a cooling station are expensive and make the establishment of small scale tempering operations cost prohibitive.

DISCLOSURE OF INVENTION

An object of the present invention is to provide a low cost, self-contained glass sheet tempering system suitable for any glass sheet tempering. The present invention is of particular consequence to small glass tempering operations as the system is capable of operation without requiring a glass sheet heating furnace.

In carrying out the above object, a glass sheet tempering system comprises spaced and opposed plenums. The plenums are defined by inner quench tubes, having arrays of quench openings, and also by outer burner tubes, defining a flame opening with the inner tube. The burners are integral with the quench. A conveyor is provided for conveying a glass sheet to be tempered in a direction of conveyance between the plenums. A gas supply communicates a pre-mix of combustible gas to the burners for combustion and flow through the flame openings to heat the glass sheet between the plenums. An air supply subsequently communicates quenching air to the arrays of openings to temper the heated glass sheet.

The glass sheet tempering system further includes a support that mounts the opposed plenums at upper and lower locations with respect to each other. The support includes an adjuster for adjusting the spacing between the upper and lower plenums to provide for even heating on upper and lower surfaces of the glass sheet.

Preferably the quench tubes and burners are transversely arranged with respect to the direction of conveyance to maximize evenness of heating and cooling of the glass sheet across both surfaces of the glass sheet.

The lower plenum includes drive shafts and drive wheels mounted on the drive shafts for engaging the glass sheet and providing the movement thereof during the heating and quenching. In one embodiment, the drive wheels include a circumferential ring of nichrome about the drive wheel periphery. In an alternative arrangement, the drive wheels are made of carbon. Both embodiments of the drive wheels are heat resistant and allow for operation under the high temperature conditions that exist during heating. A drive, which can be as simple as a mechanical crank and chain drive, reversibly drives the drive shafts and drive wheels to provide oscillatory movement of the glass sheet during the heating and tempering to avoid localized heating and hot spots associated with non-oscillating operation of the system.

Each plenum includes a supply manifold communicated with its quench tubes through which the premix of combustible gas supply and air supply are communicated. Initially, the pre-mix of combustible gas is communicated to the burner and distributed to the flame openings and thereafter, quenching air is communicated to the quench tubes and distributed through the array of openings. A control is provided for regulating operation of the pre-mix gas and air supplies. An ignition ignites the pre-mix of combustible gas for heating the glass sheet.

The objects, features, and advantages of the present invention are readily apparent from the following detailed description of the best mode for carrying out the invention when taken with the accompanying drawings.

BEST MODE FOR CARRYING OUT THE INVENTION

Figure 1:
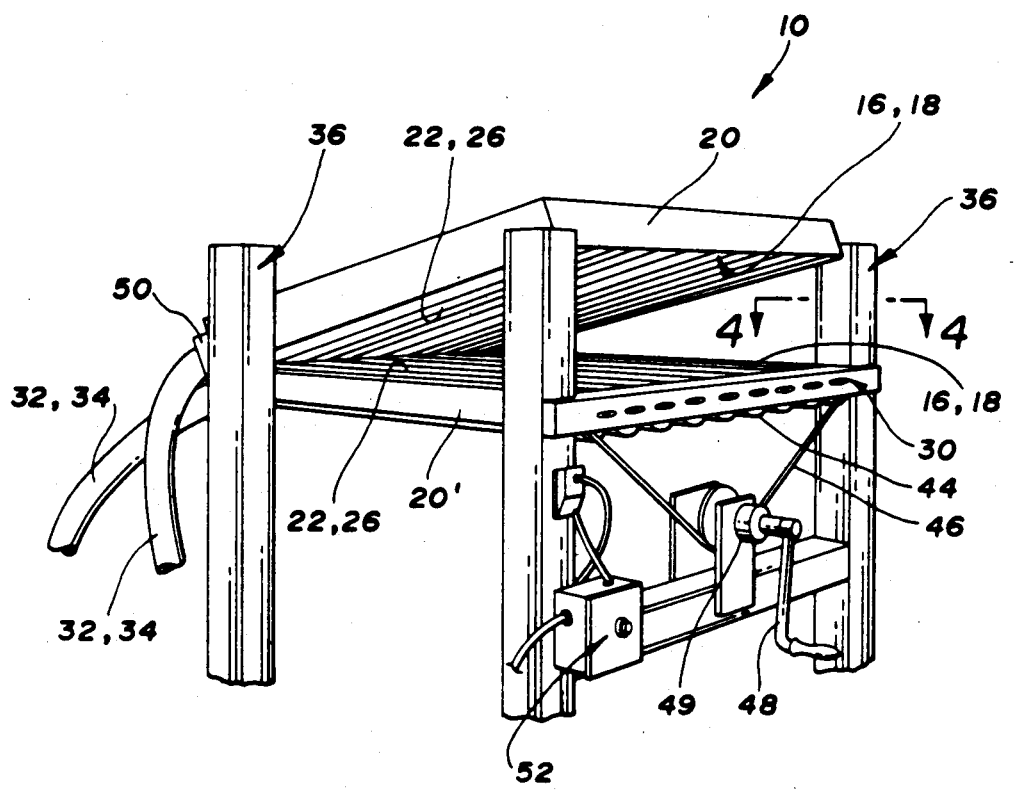
FIG. 1 is a perspective view of a glass sheet tempering system constructed in accordance with the present invention.

Referring to FIG. 1 of the drawings, a glass sheet tempering system constructed in accordance with the present invention is generally indicated by 10 and is used to perform combined heating and quenching of a glass sheet 12 at one station. As is more fully hereinafter described, the glass sheet tempering system 10 eliminates the need for a glass sheet heating furnace and is ideal for small glass tempering operations.

As shown in FIG. 1 of the drawings, the glass sheet tempering system 10 comprises a single station heater and quench including a heating source 16 for heating glass sheet 12 to be tempered and also including an air source 18 for supplying quenching air to temper the heated glass sheet. Heating source 16 and air source 18 are defined by a pair of spaced and opposed integral plenums 20,20' which provide both heating and quenching of the glass sheet 12 and without having to utilize separate heating and quenching stations.

With reference to FIGS. 1 through 5 of the drawings, the spaced and opposed plenums 20,20' are defined by inner tubes 22 having arrays of quench openings 24 and also by outer tubes 26 defining in part a flame opening 28 therealong in the shape of a slot burner. A conveyor 30, shown in FIGS. 1 through 4, supports the glass sheet 12 to be tempered and conveys it in a direction of conveyance between the plenums 20,20'. A gas supply 32 supplies a pre-mix of combustible gas to the outer tubes 26 that flows through the flame openings 28 and is thereafter combusted to heat the glass sheet 12 between the plenums 20,20'. An air supply 34 subsequently supplies quenching air to the inner tubes 22 for flow through the arrays of openings 24 to temper the heated glass sheet 12.

Figure 2:
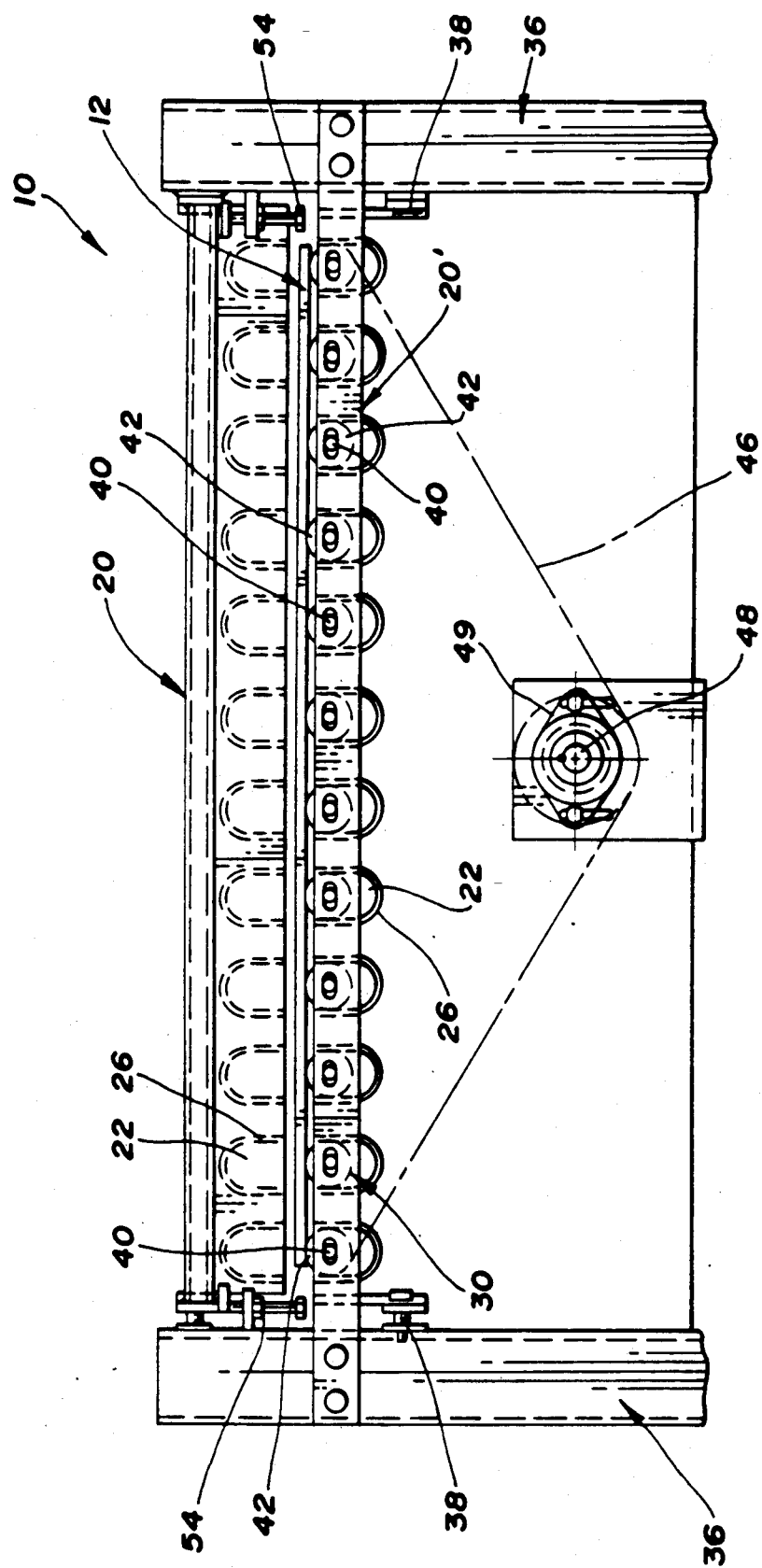
FIG. 2 is a front elevational view of the tempering system of FIG. 1 illustrating upper and lower plenums in a closed position.
Figure 3:
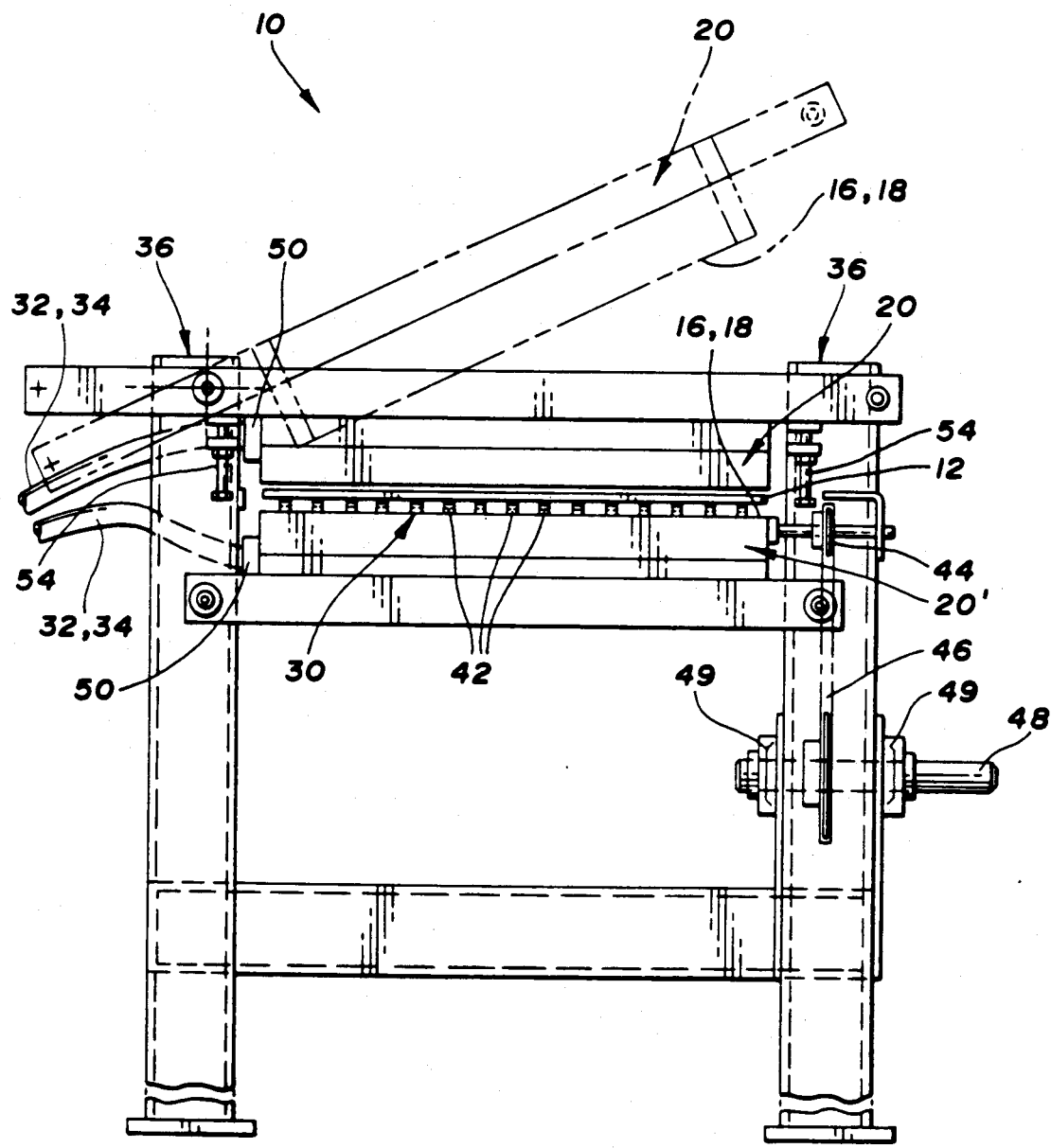
FIG. 3 is a side elevational view of the tempering system of FIG. 1 illustrating in phantom an open position of the upper plenum.

Referring to FIGS. 1 through 3 of the drawings, a support 36 mounts the opposed plenums 20,20' at upper and lower locations with respect to each other. Support 36 includes an adjuster 38 of a simple manual screw type for adjusting the spacing between the upper and lower plenums 20,20' to allow for tempering of different thicknesses of glass sheets 12. The correct spacing between the plenums 20,20' provides for even heating on upper and lower surfaces of the glass sheet which is necessary to avoid breakage of the glass sheet during heating. The upper plenum 20 is pivotal along an edge, as shown in FIG. 3, in a hinged relationship with the lower plenum 20' to allow the upper plenum to be pivoted upwardly with respect to the lower plenum so that the glass sheet 12 can be introduced between the plenums for tempering and also so that access may be had to the plenums to perform maintenance, etc.

The inner tubes 22 and outer tubes 26 are transversely arranged with respect to the direction of glass sheet conveyance or direction of oscillation during the heating and quenching to provide an even distribution of heating gas and cooling air to both surfaces of the glass sheet 12. Tubes 22 and 26 are hereinafter more fully described.

Figure 4:
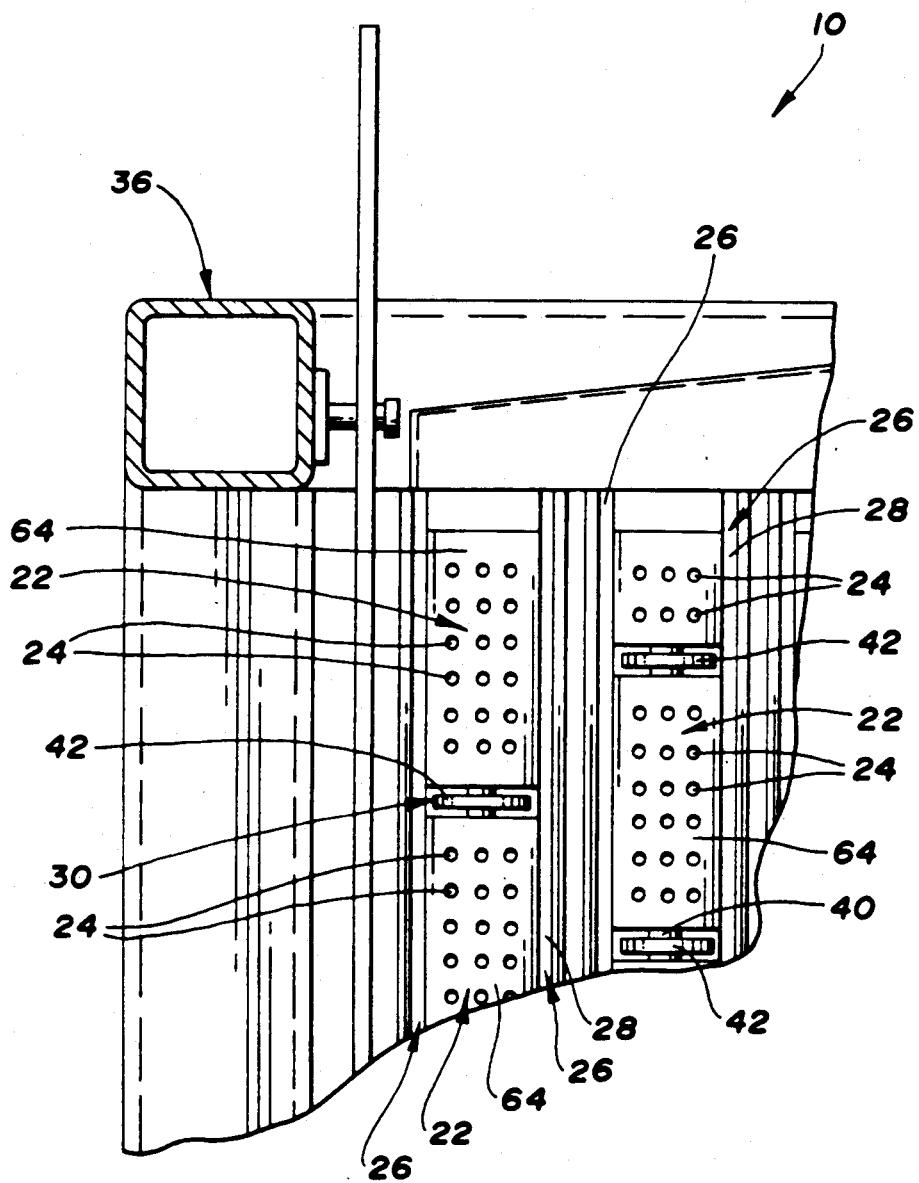
FIG. 4 is a partial sectional view taken along line 4—4 in FIG. 1 illustrating the lower plenum arrangement including quench tubes with integral burners.

With reference to FIGS. 2, 3, and 4 of the drawings, lower plenum 20' includes drive shafts 40 and drive wheels 42 mounted on the drive shafts that define conveyor 30 and are provided for engaging and supporting the glass sheet 12. Drive wheels 42 provide movement of the glass sheet 12 in an oscillating manner during the heating and quenching. Sprockets 44 are mounted on drive shafts 40 and are driven by a chain 46 actuated by a hand crank 48, seen in FIG. 1, mounted in a bearing assembly 49. Other types of conveyor mechanisms are contemplated whereby required oscillatory movement of glass sheet 12 is provided by a controller driven assembly.

Figure 5:
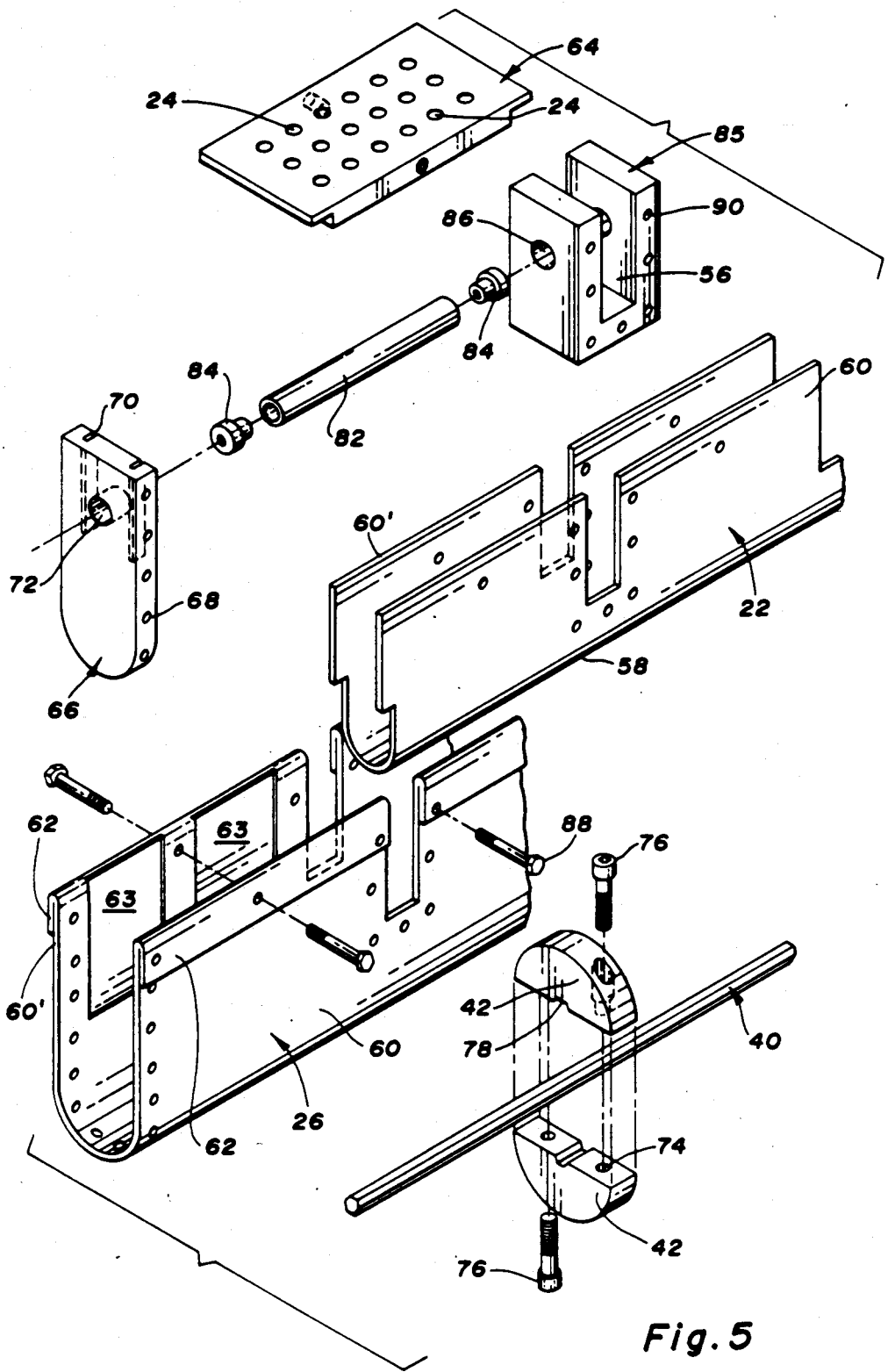
FIG. 5 is a broken out view of an inner tube and an outer tube illustrating arrays of quench openings and the construction of slot burners therealong said tubes.

Drive wheels 42, shown in FIGS. 4 and 5, include a circumferential ring of a high temperature resistant material about the drive wheel periphery which is capable of withstanding the high temperatures generated during the tempering process. A nickel-chromium alloy is such a suitable temperature resisting material. Carbon wheels are also effective for withstanding the high temperatures associated with the heating and for engaging the glass sheet 12.

In FIGS. 1 and 4 of the drawings, each plenum 20,20' includes a supply manifold 50 communicated to the plenum. The pre-mix of combustible gas supply and air supply define the supply manifold 50 which initially communicates the combustible gas to the outer tubes 26 and flame openings 28 and after the heating, quenching air is communicated to the inner tubes 22 and quench openings 24. A control 52 regulates operation of the gas and air supplies. An ignition 54 is provided for igniting the pre-mix of combustible gas for heating the glass sheet 12.

A preferred construction of inner tube 22 and outer tube 26 assembly is shown in FIG. 5. The inner tube 22 and outer tube 26 illustrated are for lower plenum 20' and further include drive shaft 40 and drive wheels 42. The inner tube 22 and outer tube 26 comprise a pair of complementary U-shaped tubes that fit one inside the other forming a passageway therebetween that allows the pre-mix of combustible gas to be supplied from the supply manifold 50 at one end without interruption from the drive wheels 42 that are spaced along the quench tubes in wheel wells 56. Each U-shaped tube 22,26 has a bottom wall 58 with integral, upwardly depending, opposing side walls 60 and 60, The side walls 60,60' of outer tube 26 are provided with downwardly bent edges 62. Flame openings 28 are formed by the spacing between the two tubes 22,26 at their topside edges when the tubes are positioned together. Most preferably, flame openings 28 are formed by fabricating a recess 63 in the outer tube wall 60' as shown to thereby form a passageway for directing the pre-mix of combustible gas along the outside of wall 60' of the inner tube 22. Preferably, opening 28 is about 0.008 inches between inner and outer tubes 22, 26.

A top plate 64 having the quench openings 24 therein mounts atop the innerly mounted tube 22 forming a passageway therein that allows the quenching gas to be supplied from the supply manifold 50 at one end without interruption from the drive wheels 42 spaced therealong. An end cap 66 is provided on one end of the inner tube 22 and outer tube 26, opposite the manifold 50 to mount the respective U-shaped tubes in their spaced arrangement and to provide a seal. End cap 66 includes a plurality of threaded apertures 68 about its peripheral edge for securement thereto of outer tube 26. End cap 66 also includes slots 70 therein for receiving, sealingly engaging and positioning inner tube 22. Finally, end cap 66 includes drive shaft aperture 72 extending therethrough through which drive shaft 40 extends for support and rotation.

The wheels 42 shown are of a two-piece construction being boltable together through a conventional combination of threaded aperture 74 and bolt 76 for ease of assembly; however, wheels 42 can be of a one piece construction and slid onto the drive shaft 40. Wheels 42 also include a hub 78 complementarily shaped to key the wheels onto drive shaft 40, illustrated as a hexagonal shaft, for rotation with the drive shaft. A drive shaft housing 82 is provided to encase the drive shaft 40 and to thereby assure that the pre-mix gas and quench gas remain in their respective passageways. Also included are seals 84 that fit into the ends of drive shaft housing that aid in assuring separation of the gasses. A bearing block housing 85 including a drive shaft mounting aperture 86 is provided and mounts drive shaft 42 for rotation therein. As can be seen, the bearing block housing 85 also assists in the assembly of the inner tube 22, outer tube 26, drive shaft 40 and drive shaft housing 60; securing and being secured by conventional bolt 88 and threaded aperture 90 connections.

OPERATION OF THE INVENTION

Glass sheet tempering system 10 is operated by placing a glass sheet 12 between opposed plenums 20,20' on drive wheels 42 when upper plenum 20 is in an upwardly pivoted position. Upper plenum 20 is then return pivoted to a parallel spaced arrangement with respect to the lower plenum 20' for subsequent heating of the glass sheet 12. Drive wheels 42 are operated to provide oscillatory movement of glass sheet 12 back and forth during the heating and quenching. Control 52 is actuated to supply the pre-mix of combustible gas to the flame openings 28 and ignition 54 is operated to ignite the combustible gas emanating from flame openings 28 to heat the glass sheet 12. The glass sheet 12 is constantly moved back and forth during the heating so that it does not develop hot spots.

After the glass sheet 12 has reached the temperature required for tempering, control 52 is actuated to shut off the pre-mix of combustible gas supply and quenching air is immediately communicated to the inner tubes 22 and through quench openings 24 to quench glass sheet 12.

Quenched glass sheet 12 is removable from glass sheet tempering system 10 by upwardly pivoting upper plenum 20 with respect to lower plenum 20' to gain access and then lifting the glass sheet from the tempering system by suitable means.

While the best mode for carrying out the invention has been described in detail, those familiar with the art to which this invention relates will recognize various alternative designs and embodiments for practicing the invention as defined by the following claims.

What is claimed is:

1. A glass sheet tampering system comprising: spaced and opposed plenums; said plenums including quench tubes having integral burners; each said quench tube being defined by complementary inner and outer generally U-shaped tubes; said tubes fitting one inside the other forming a passageway therebetween for communicating combustible gases; said outer U-shaped tube including recesses fabricated along its inside edge whereby a generally slot-shaped opening defining said burner is established along an edge of said quench tube; a top plate having quench openings therein fitting atop the inside U-shaped tube forming a passageway therein for communicating quench air; a conveyor for conveying a glass sheet to be tempered in a direction of conveyance between said plenums; a gas supply means for supplying a pre-mix of combustible gas to said burners for flow through the slot-shaped openings and combustion to heat the glass sheet between the plenums; and an air supply means for subsequently supplying quenching air to the arrays of openings in the quench tubes to tamper the heated glass sheet.

2. A system as in claim 1 further including a support that mounts the opposed plenums at upper and lower locations with respect to each other.

3. A system as in claim 2 wherein said support includes an adjuster for adjusting the spacing between the upper and lower plenums to provide for even heating on upper and lower surfaces of the glass sheet.

4. A system as in claim 3 wherein said burners and quench tubes are transversely arranged with respect to the direction of conveyance to provide an even distribution of heating gas and cooling air to the glass sheet.

5. A system as in claim 4 wherein said upper and lower plenums each include a supply manifold communicated thereto; and said pre-mix of combustible gas supply and said air supply define said supply manifold which initially distributes the pre-mix of combustible gas to the burners and thereafter distributing the quenching air to the quench tubes.

6. A system as in claim 5 which includes a control for regulating operation of the gas and air supplies.

7. A system as in claim 6 further including an ignition for igniting the pre-mix of combustible gas for the heating.

8. A system as in claim 4 further including a drive means for reversibly driving said drive shafts and drive wheels to provide the oscillatory movement of the glass sheet.

9. A system as in claim 4 wherein the lower plenum includes drive shafts and drive wheels mounted on the drive shafts for engaging the glass sheet and providing oscillatory movement thereof during the heating and quenching.

10. A system as in claim 9 wherein said drive wheels are spaced longitudinally along the direction of conveyance and also spaced transversely thereto to expose a large area of the glass sheet for the heating and quenching.

11. A system as in claim 10 wherein said quench tubes include wheel wells to accommodate the drive wheels.

12. A system as in claim 9 wherein said drive wheels include a circumferential ring of a high temperature resistant material about the drive wheel periphery.

13. A system as in claim 12 wherein said high temperature resistant material is a nickel-chromium alloy.

14. A system as in claim 12 wherein said drive wheels are made of carbon.

15. A glass sheet tampering system comprising spaced and opposed plenums; said plenums being defined by quench tubes having arrays of quench openings and also by a flame opening defining a burner along an edge of said quench tubes; said burners being integral with said quench tubes; a support mounting the opposed plenums at upper and lower locations with respect to each other; a conveyor for conveying in a direction of conveyance a glass sheet to be tempered between the plenums; said quench tubes and burners being transversely arranged with respect to the direction of conveyance; a gas supply means for supplying a pre-mix of combustible gas to the plenums for combustion and flow through the flame openings to heat the glass sheet between the plenums; and an air supply means for subsequently supplying quenching air to the arrays of openings to tempered the heated glass sheet.

16. A glass sheet tempering system comprising spaced and opposed plenums; said plenums being defined by quench tubes having arrays of quench openings and also by a flame opening defining a burner along an edge of said quench tubes; said burners being integral with said quench tubes; a support mounting the opposed plenums at upper and lower locations with respect to each other; a conveyor for conveying in a direction of conveyance a glass sheet to be tempered between the plenums; said lower plenum including drive shafts and drive wheels mounted on the drive shafts that define the conveyor; said quench tubes and burners being transversely arranged with respect to the direction of conveyance; a gas supply means for supplying a pre-mix of combustible gas to the plenums for combustion and flow through the flame openings to heat the glass sheet between the plenums; and an air supply means for subsequently supplying quenching air to the arrays of openings to temper the heated glass sheet.

* * * * *